United States Patent
Ayers et al.

(10) Patent No.: US 7,783,618 B2
(45) Date of Patent: *Aug. 24, 2010

(54) APPLICATION SERVER (AS) DATABASE WITH CLASS OF SERVICE (COS)

(75) Inventors: John I. Ayers, Omaha, NE (US); Anders H. Askerup, Omaha, NE (US); Bradley T. Kenyon, Omaha, NE (US); Srinivas Chilukuri, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 974 days.

This patent is subject to a terminal disclaimer.

(21) Appl. No.: 11/213,357

(22) Filed: Aug. 26, 2005

(65) Prior Publication Data

US 2007/0047530 A1    Mar. 1, 2007

(51) Int. Cl.
 *G06F 17/30* (2006.01)
(52) U.S. Cl. .................. 707/706; 707/752; 707/754
(58) Field of Classification Search ............... None
See application file for complete search history.

(56) References Cited

U.S. PATENT DOCUMENTS

| | | | |
|---|---|---|---|
| 7,613,705 | B2 | 3/2009 | Ayers et al. |
| 2003/0163545 | A1 | 8/2003 | Koskelainen et al. |
| 2004/1058618 | | 8/2004 | Shaw |
| 2004/0186901 | A1 | 9/2004 | Guigui |
| 2004/0193700 | A1 | 9/2004 | Westman et al. |
| 2004/0234060 | A1 | 11/2004 | Tammi et al. |
| 2005/0136926 | A1 | 6/2005 | Tammi et al. |
| 2005/0190772 | A1* | 9/2005 | Tsai et al. .............. 370/395.52 |
| 2005/0278420 | A1 | 12/2005 | Hartikainen et al. |
| 2006/0035367 | A1 | 2/2006 | Westman |
| 2006/0035637 | A1* | 2/2006 | Westman .................. 455/435.3 |
| 2006/0140385 | A1 | 6/2006 | Haase et al. |
| 2006/0212511 | A1* | 9/2006 | Garcia-Martin ............. 709/203 |
| 2006/0225128 | A1 | 10/2006 | Aittola et al. |
| 2007/0002779 | A1* | 1/2007 | Lee et al. ..................... 370/260 |
| 2007/0046253 | A1 | 1/2007 | Ayers et al. |
| 2007/0047558 | A1 | 1/2007 | Ayers et al. |
| 2007/0209061 | A1 | 9/2007 | Dekeyzer et al. |

FOREIGN PATENT DOCUMENTS

| | | |
|---|---|---|
| WO | WO 2004/088950 | 10/2004 |
| WO | WO 2004/089023 | 10/2004 |

OTHER PUBLICATIONS

Wikipedia, The Free Encyclopedia, IP Multimedia Subsystem, http://en.wikipedia.org, pp. 1-8, prior to Aug. 2005.

(Continued)

*Primary Examiner*—Baoquoc N To

(57) ABSTRACT

Systems, methodologies, media, and other embodiments associated with provisioning an internet protocol (IP) multimedia core network subsystem (IMS) are described. One exemplary system embodiment includes logic for provisioning an IMS application server (AS) database with AS data and logic for provisioning an IMS user database with user data. The exemplary system embodiment may also include logic for provisioning an IMS initial filter criteria (IFC) database with data that relates a user to an AS based, at least in part, on an AS class of service (COS) identifier.

15 Claims, 7 Drawing Sheets

OTHER PUBLICATIONS

Wikipedia, The Free Encyclopedia, IP Multimedia Subsystem, http://en.wikipedia.org, pp. 1-8, prior to Aug. 2005.
European Patent Office; Patent Search Report & Written Opinion of Int'l. Searching Authority for Appl. PCT/US2006/027874; dated Dec. 8, 2006.
Sophia-Antipo; Digital Cellular Telecom. System (Phase 2+) ETSI Standards; 2005-06; pp. 7-8, 13-15; vol. 3-CN4, No. V5100; European Telecom. Standards Institute; France.
International Search Report; dated Dec. 12, 2006.
Written Opinion of the International Searching Authority or the Declaration; dated Dec. 12, 2006.
International Preliminary Report on Patentability ; Dated Aug. 26, 2005.
Hoffer et al: Logical Database Design and the Relational Model; Library of Congress Ctataloging-in-Publication Data; Modern Database Management seventh edition; pp. 1987-226.
Response to European Search report; dated Jan. 11, 2010.
Office action dated Sep. 16, 2009 from U.S. Appl. No. 11/213,363.
Office action dated Apr. 1, 2010 from U.S. Appl. No. 11/213,363.
Office action dated Jan. 6, 2010 from U.S. Appl. No. 11/212,246.

* cited by examiner

APPLICATION SERVER (AS) DATABASE WITH CLASS OF SERVICE (COS)

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application is related to the following U.S. patent applications, which are all assigned to the present assignee:

"Automated Application Server (AS) Permissions Provisioning", Ser. No. 11/213,363 filed Aug. 26, 2005, inventors: Ayers et al.;

"Charging Database with Class of Service (COS)", Ser. No. 11/212,246 filed Aug. 26, 2005, inventors: Ayers et al.;

"Initial Filter Criteria (IFC) Database with Class of Service (COS)", Ser. No. 11/213,361 filed Aug. 26, 2005, inventors: Ayers et al.

BACKGROUND

Telephones no longer just transmit and receive telephone calls. Devices including cellular telephones, PDAs, laptop computers, and so on, collectively referred to as user equipment (UE), may transmit and receive telephone calls, may transmit and receive text messages, may participate in videoconferencing, may participate in multi-player gaming, may share content, and so on. These types of activities may be referred to collectively as multimedia services. In some cases these multimedia services may be provided over the Internet using the Internet Protocol (IP).

An internet protocol (IP) Multimedia Core Network Subsystem (IMS) includes core network (CN) elements for providing IP multimedia services. These IP multimedia services may include telephony (e.g., Voice over IP (VoIP)), push to talk over cellular (PoC), text messaging, and so on. Within various services, other sub-services may be provided. For example, in the telephony service, sub-services including call forwarding, call waiting, voice mail, multi-party calling, and so on, may be provided. Conventionally, each of these services and/or sub-services may have been provided by a stand-alone electronic system, computer, and/or computer system.

In the pre-IMS environment, services were specified and supported by a single logical node and/or set of nodes that performed specialized features for the service. Each service appeared as an island with its own service specific node(s). In the IMS environment, services are hosted by an application server (AS). An AS may be a physical and/or logical entity. A single AS may host multiple services (e.g., telephony, messaging) and/or a single service may require more than one AS. An AS may be described by data that characterizes various attributes like a service provider location, capability, availability, and so on. An AS set may provide similar and/or identical services to facilitate load balancing, fault tolerance, and so on. Thus, it may not be known ahead of time which particular AS will be providing a service.

IMS defines how requests for service are routed to an AS that can provide the service. IMS also may also define which protocols are supported in a communication network, how a user is charged, and so on. A user may access services via a dynamically associated, service-independent, standardized access point referred to as a call session control function (CSCF). A CSCF may be dynamically allocated to a user at log-on or when a request addressed to the user is received. Once authenticated through an IMS service, the user may access other IMS services for which the user is authorized. Authentication may be handled by the CSCF as the user signs on.

Services are not provided in a vacuum. User demand may provide a rationale for providing services. Furthermore, not all services are provided free of charge. Thus, organizations may establish IMS based communication networks to facilitate providing services to users, tracking usage, and charging users for services provided, among other things. These organizations maintain data not only about their network but also about the users (e.g., subscribers) who use the network and consume the services provided. Typically, a large database that stores a record for each subscriber may be employed. The database may store information including public and private user identities, services subscribed to, charges incurred, a subscriber's home network, a service provided by an AS, a CSCF available to handle communications, and so on.

Since a service may be provided by an AS, and since a user may subscribe to use a service, information about an AS may be stored in subscriber records. However, this creates provisioning, updating, maintenance, and other issues for database systems administrators and network administrators. By way of illustration, consider a business that manages a network having one million subscribers that use different services. Further consider that 100,000 of these subscribers use a particular service. In this situation 100,000 records may include duplicated information (e.g., AS name, AS location) concerning an AS that provides the particular service. If information concerning the AS changes, then the system administrator may need to locate the 100,000 relevant records and then update each of the 100,000 records.

Additionally, adding and/or defining a user may create issues. For example, every user that is added or defined in the database may force the administrator to have to re-provision and define AS information for the user. This creates many opportunities for errors as each record is individually provisioned with AS data.

However, the issues do not stop with database record maintenance. As described above, messages may be handled by a CSCF. Handling the message may include acquiring user information and distributing it to various switches in a communication network. For example, a logical CSCF, which may include several physical components, may acquire user information including AS information. Now if the AS information changes, not only does each user record having the AS information have to change, but so too does each CSCF component having the AS information. In a large network this switch updating may be burdensome.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may

DETAILED DESCRIPTION

Figure 1:
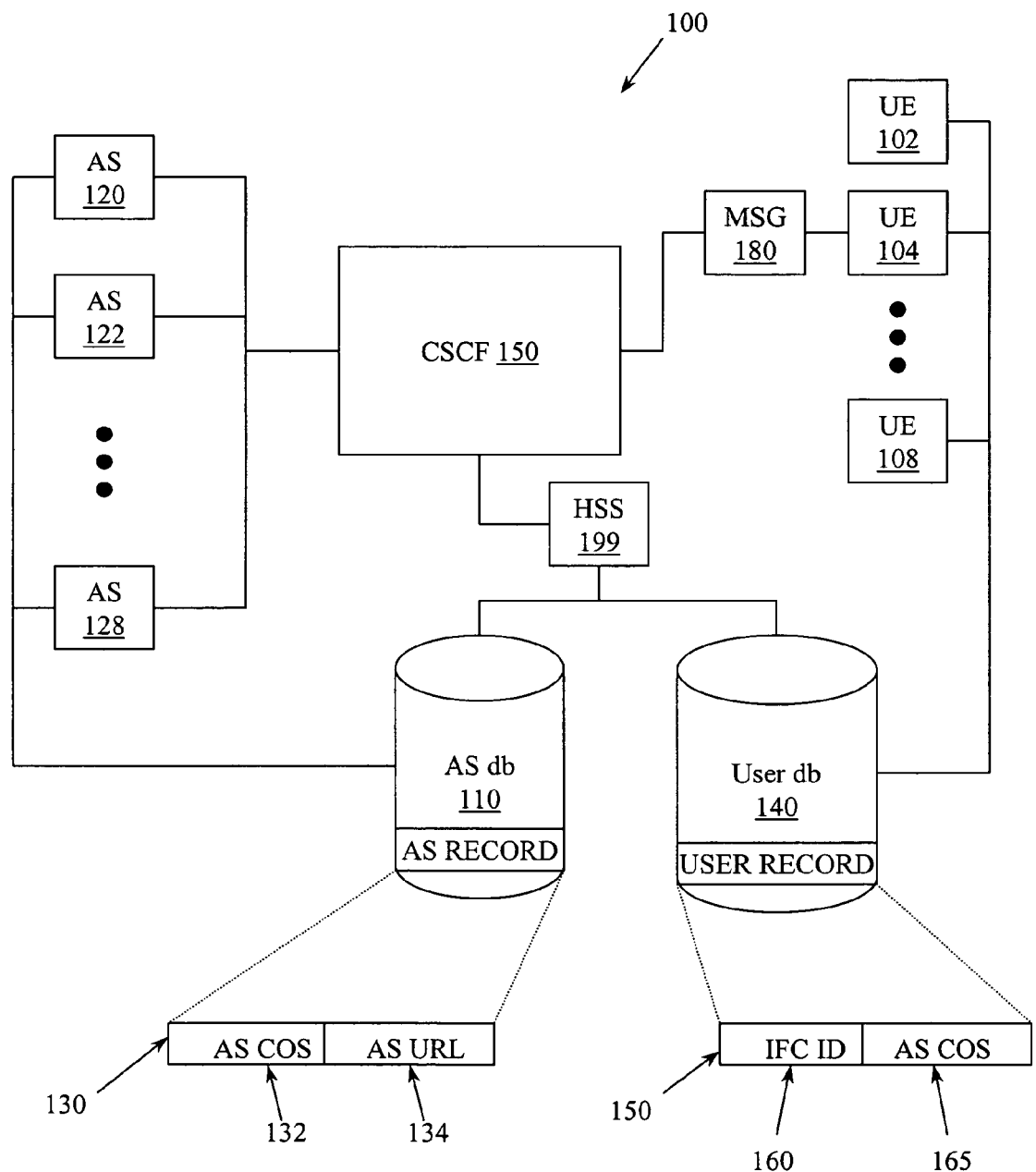
FIG. 1 illustrates an example IMS.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly storing and providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software in execution and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software in execution. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be developed using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example IMS 100. IMS 100 facilitates providing services to users equipped with user equipment (UE) (e.g., 102, 104, . . . 108). UE may include, for example, cellular telephones, personal digital assistants (PDAs), and so on. A UE may be associated with a user described in IMS 100. A UE may be configured to run a Session Initiation Protocol (SIP) agent. SIP facilitates actions including initiating, modifying, and terminating an interactive IMS user session. SIP may employ proxy servers to help route requests, authenticate users, authorize users for services, and so on.

IMS 100 may include an AS database 110 that is configured to store AS information concerning an AS (e.g., 120, 122, . . . 128) that is configured to provide multimedia services. An AS provides services to which users may subscribe. The services may include, for example, telephony, video-conferencing, multi-player gaming, and so on. With a service like telephony an AS may provide sub-services including, for example, call forwarding, call waiting, multi-party calling, and so on. In different examples, an AS may be located in a user home network or in an external network. An AS may be described by information concerning an address, a location, a service(s) provided, a name, how processing should proceed if an AS can not be accessed, and so on.

An AS may be dynamic and thus may be dynamically configured. That means that information describing an AS may change. In some cases it may change frequently. Thus, rather than store AS information in user records, as is done conventionally, IMS 100 decouples direct AS information from user records by introducing AS database 110. Therefore, AS information may be stored in an AS record 130 in AS database 110. AS record 130 may include, for example, an AS COS identifier 132 and an AS uniform resource locator (URL) 134. While a URL 134 is described, it is to be appreciated that in some examples an AS address may take other forms. An AS COS may be, for example, a number that is made available to IMS 100, where the number can be associated with the type of thing that an AS with that COS identifier can provide. Thus, at different times a different AS may be associated with an AS COS. At some point, IMS 100 will attempt to resolve an actual AS address. Thus, AS database 110 may use the AS COS identifier as a primary key that facilitates searching AS database 110 by AS COS and returning an AS URL for an AS that will provide the desired service.

IMS 100 may also include a user database 140 that is configured to store user information concerning a user that subscribed to access a service provided by an AS. The user information may be stored in a user record 150 in user database 140. User record 150 may include, for example, one or more initial filter criteria (IFC) entries. An IFC entry may include both an IFC identifier field 160 and an AS COS field 165. Thus, rather than user record 150 carrying the URL of an AS to provide a service, user record 150 carries an identifier that can be linked to an AS that provides a desired service. Decoupling the AS URL from user data in this manner facilitates mitigating database maintenance and switching issues described above.

IMS 100 may include a Home Subscriber Server (HSS) logic 199 configured as a portion of an IMS through which a user may access a service. IMS 100 may also include a CSCF logic 150 that is configured to receive a message 180 associated with a user. In one example message 180 may be an SIP message. Message 180 may originate at a UE or may be intended for a UE. CSCF logic 150 may be configured to interact with HSS logic 199 to retrieve a user record concerning the user from the user database 140. User record 150 may include an IFC identifier 160 that facilitates locating an IFC (not illustrated). The IFC may include trigger points that describe how and when a message is to be forwarded to an AS. Thus, CSCF logic 150 may be configured to evaluate message 180 in light of an IFC associated with the retrieved user record. By way of illustration, a message may include header information like a FROM field. A trigger point in an IFC may have different rules describing how different values found in the FROM field control to which AS a message will be forwarded. By way of further illustration, a message may be described by information like a region field. A trigger point in an IFC may have different rules, implemented as attribute/value pairs, that control to which AS a message will be forwarded based on the region field. The region field may be populated, for example, when a user is roaming outside their home network.

CSCF logic 150 may be configured to selectively direct message 180 to an AS. To direct a message to an AS, CSCF logic 150 may be tasked with determining the actual address (e.g., URL) of the AS. Thus, CSCF logic 150 may be configured to determine an AS address using AS database 110 as indexed by the AS COS identifier 165 available in the IFC entry. CSCF logic 150 may access AS database 110 using HSS logic 199. While AS database 110 and user database 140 are illustrated as separate components, in one example, AS database 110 and user database 140 may be organized in an HSS database. Additionally, CSCF logic 150 may be configured to communicate with the HSS database using the Cx interface.

Figure 2:
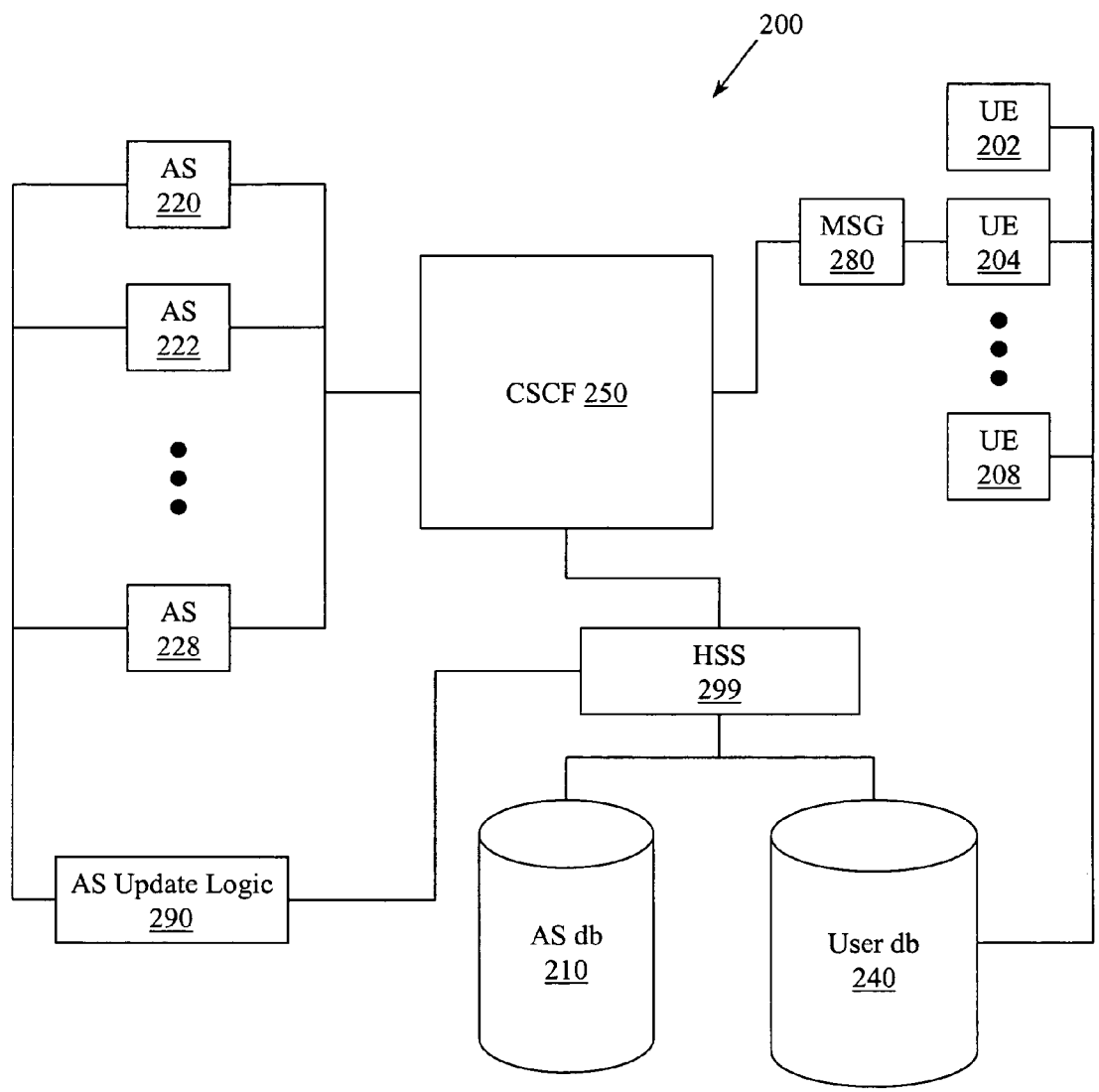
FIG. 2 illustrates an example IMS.

FIG. 2 illustrates an example IMS 200. IMS 200 includes components similar to those described in connection with FIG. 1. For example, IMS 200 includes an AS database 210, a user database 240, an HSS logic 299, and a CSCF logic 250. IMS 200 facilitates routing a message 280 received from a UE (e.g., 202, 204, . . . 208) to an AS (e.g., 220, 222, . . . 228).

As described above, an AS may be dynamically configured and may experience various changes. For example, an AS may go on/off line, an AS may experience increased/decreased capacity, an AS may experience increased/decreased availability, an AS may be reconfigured to provide additional services, and so on. When these changes occur, information concerning the AS should also be changed. Storing this information in AS database 210 rather than in user database 240 facilitates mitigating database maintenance issues described above. Therefore, IMS 200 may include an AS update logic 290 that is configured to update an AS record in AS database 210 upon determining that information concerning an AS has changed. Therefore CSCF logic 250 and user database 240 may process an AS COS identifier and be unaware that anything has changed behind the scenes.

While a single CSCF logic 250 is illustrated, it is to be appreciated that a CSCF logic may perform various roles and/or may be distributed between various logics. For example, a CSCF may perform a P-CSCF (proxy) role, an I-CSCF (interrogator) role, and/or an S-CSCF (serving) role.

The proxy may be a first point of contact for a message, may be involved in authenticating a user, and may facilitate generating charging information, among other things. The interrogator may be an entry point to a domain for SIP packets, may query an HSS to retrieve user location information, and so on. The S-CSCF may perform session control and thus may perform, for example, SIP registration. In some examples, the S-CSCF may communicate with an HSS using the Cx protocol and may communicate with an AS using the Sh protocol and/or the Diameter protocol. In general it is the S-CSCF that determines to which AS an SIP message will be sent. Conventionally the S-CSCF would therefore be provisioned with the address (e.g., URL) of each AS and/or other AS information. As AS information changed, the S-CSCF would have to be changed. An example Cx protocol is described in 3GPP TS 29.228 V5.12.0 (2005-06) and 3GPP TS 29.229 V5.10.0 (2005-03). An example Sh protocol is described in 3GPP TS 29.328 V5.10.0 (2005-06) and 3GPP TS 29.329 V5.10.0 (2005-03).

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Figure 3:
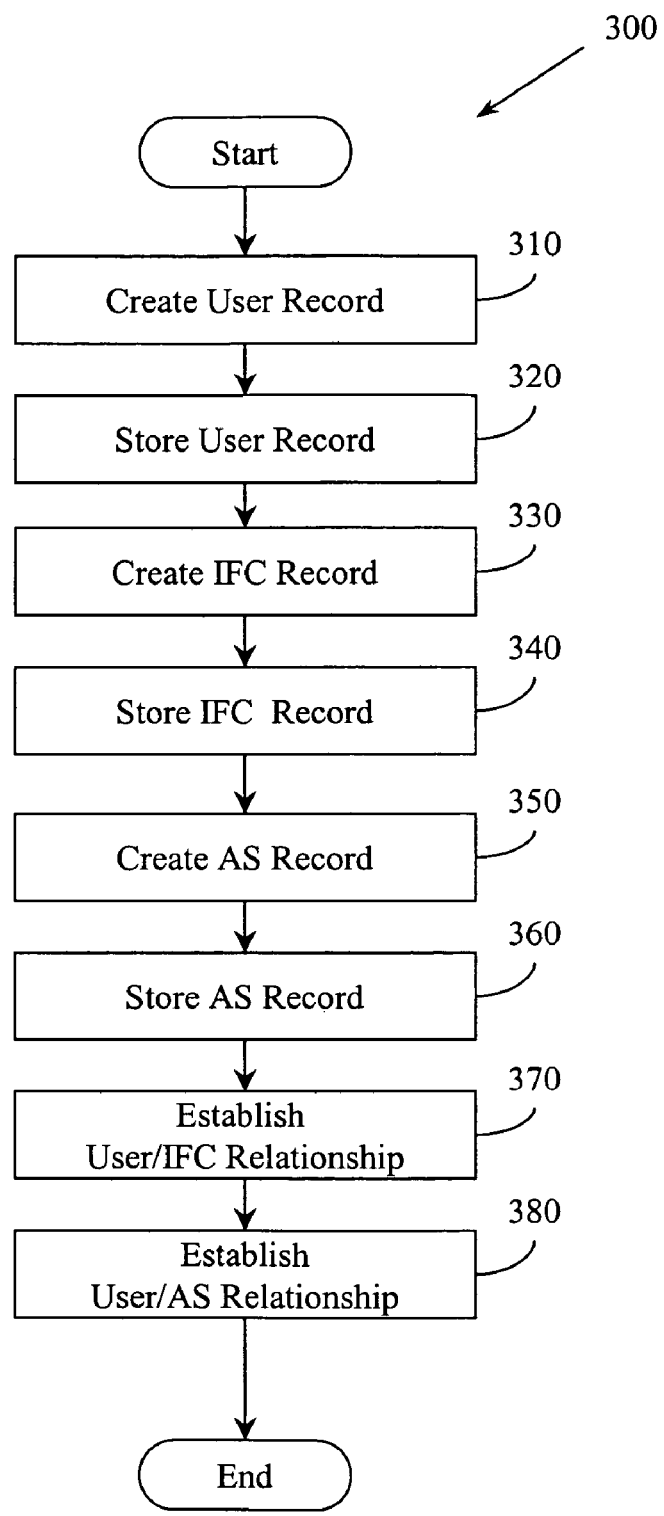
FIG. 3 illustrates an example method for configuring a portion of an IMS.

FIG. 3 illustrates an example method 300 for configuring an IMS. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methods can be implemented as processor executable instructions and/or operations provided by a computer-readable medium. In another example, the processing blocks may represent functions and/or actions performed by functionally equivalent circuits like an analog circuit, a digital signal processor circuit, an application specific integrated circuit (ASIC), or other logic device.

Method 300 facilitates configuring a portion of an IMS. Method 300 may include, at 310, creating user records. The user records may include links to IFC records. Method 300 may also include, at 320, storing the user records. The IFC records store data that control, for example, when, how, and which AS to access. An IFC record may be provided to a CSCF to facilitate evaluating a received message and thus to facilitate routing the message based on its attributes as examined in light of an IFC.

Thus, method 300 may also include, at 330, creating IFC records that include AS COS identifiers. Rather than storing an AS address in an IFC, as was done conventionally, a more abstract value (e.g., AS COS identifier) is stored. This AS COS identifier facilitates just-in-time address resolution and thus facilitates decoupling AS data from user data like IFCs. Method 300 may also include, at 340, storing the IFC records.

Method 300 may also include, at 350, creating AS records that include an AS identifier, and an AS address. In some examples, the AS identifier may be an AS COS. In other examples, the AS identifier may facilitate relating an AS COS to an AS record. Method 300 may also include, at 360, storing the AS records in an AS database that is operably connected to the IMS. To facilitate searching the AS database using an AS COS, the AS database may be arranged with the AS identifier as a primary key.

With the three databases established, and with data concerning an AS, a user, and so on stored, method 300 may proceed, at 370, with establishing a relationship between a user record and an IFC record. Similarly, method 300 may include, at 380, establishing a relationship between a user record and an AS record by manipulating an AS COS identifier in an IFC record related to the user record. Thus, while a conventional user record typically included actual AS data, the example method facilitates having a user record store more abstract AS data and/or links to more abstract AS data. This additional level of abstraction facilitates making changes to AS data without requiring updates to user data.

Method 300 describes configuring a portion of an IMS to be ready to handle messages. In some examples, method 300 may also include additional configuring after messages arrive. For example, method 300 may include, (not illustrated), upon receiving in a CSCF a message associated with a user of the IMS, providing to the CSCF an IFC record(s) related to the user. Thus, when a user actually wants access to a service (e.g., user dials phone) information about how to route messages for that user is provided to the CSCF. The message may be, for example, an SIP message. The message may originate with a user or may be directed towards a user (e.g., someone calls user).

Additionally, in response to determining to route a message to an AS by evaluating the message with respect to the IFC records provided to the CSCF, method 300 may also include (not illustrated) providing portions of an IFC record and/or other service data to the AS. This second provision of IFC data may facilitate an AS double-checking decisions made by a CSCF and/or providing additional fine-grained control within the AS.

As described above, an AS may experience changes. Thus, method 300 may also include reconfiguring an IMS as AS changes occur. Therefore, method 300 may also include, (not illustrated), updating an AS record upon determining that the AS state has changed. Since a CSCF may be tasked with routing a message, method 300 may also include, (not illustrated), providing an AS address to a CSCF. Providing the AS address to the CSCF may include, for example, selecting an AS address from an AS record based, at least in part, on an AS COS identifier in a user record.

While FIG. 3 illustrates various actions occurring in serial, it is to be appreciated that various actions illustrated in FIG. 3 could occur substantially in parallel. By way of illustration, a first process could create and store user records, a second process could create and store IFC records, a third process could create and store AS records, and a fourth process could create relationships between the records. While four processes are described, it is to be appreciated that a greater and/or lesser number of processes could be employed and that lightweight processes, regular processes, threads, and other approaches could be employed.

Figure 4:
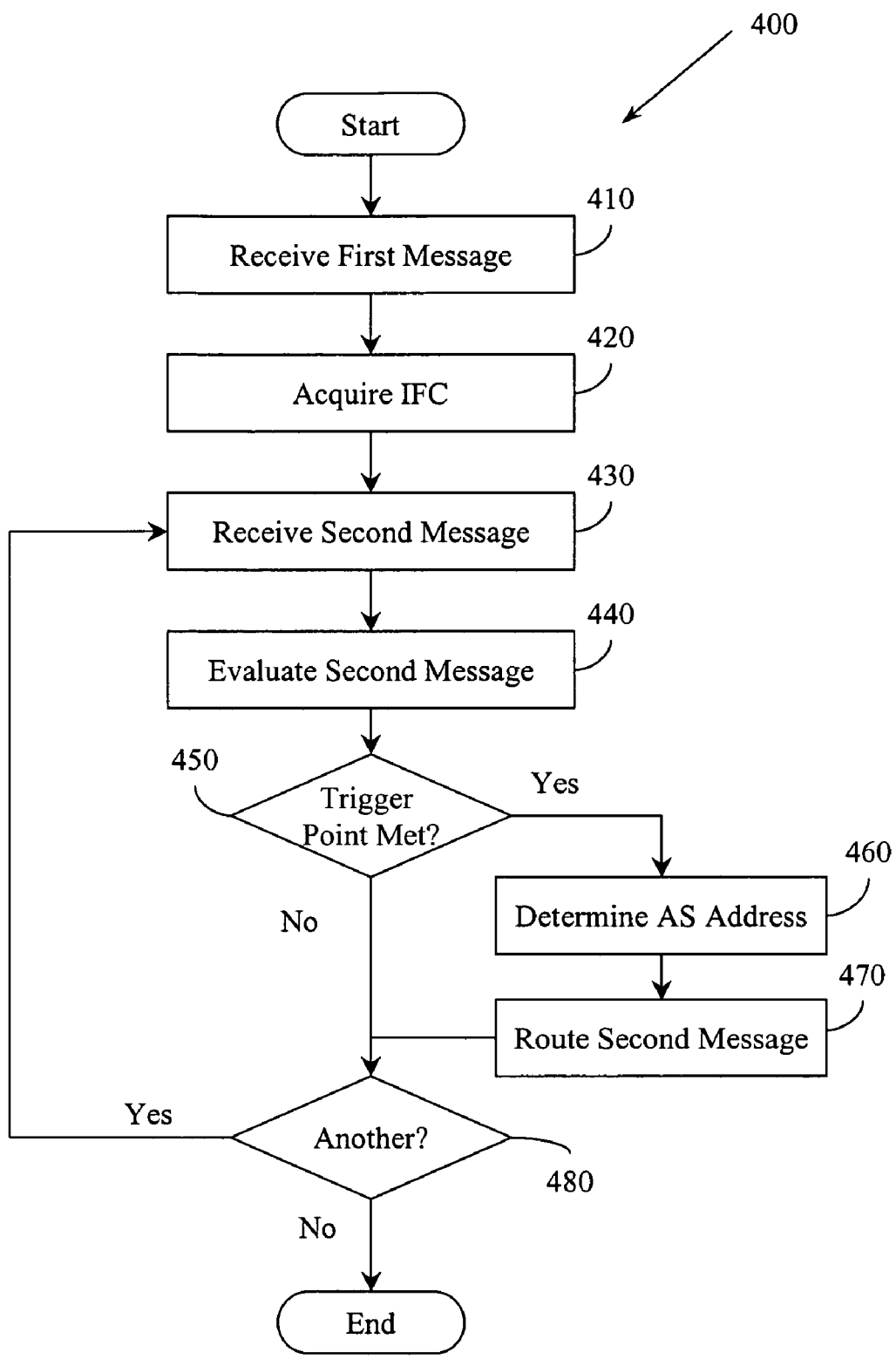
FIG. 4 illustrates an example method for handling a message related to providing a service through an IMS.

FIG. 4 illustrates an example method 400 associated with handling messages related to providing a service through an IMS. Method 400 includes, at 410, receiving a first message associated with providing a service for a user. The message may be received, for example, in a CSCF logic. The first message may be, for example, an SIP message and/or a Diameter message. The message may originate with a user or may be directed towards a user.

Method 400 may also include, at 420, acquiring IFC data for the user. The IFC data may include, for example, an AS COS data and trigger points that control message forwarding to an AS. The IFC data may be retrieved, for example, from an HSS logic. In some examples, the IFC data may also include an AS identifier resolved, at least in part, by using an AS COS. The IFC data may be acquired using, for example, a Cx SAR/SAA exchange.

Method 400 may also include, at 430, receiving in the CSCF logic a second message associated with providing the service. While a second message is described, it is to be appreciated that in some examples the second message may logically and/or physically be part of the first message. The second message may be, for example, an SIP message or a Diameter message. The second message may originate with the user or be directed to the user.

Method 400 may also include, at 440, evaluating the second message with respect to the IFC data for the user. For example, message header, message contents, metadata concerning the message, information about the user from which the message was received, and so on, may be processed by trigger points in the IFC to determine whether a trigger has been satisfied. By way of illustration, a message header may describe a type of service that is desired (e.g., news download). A trigger point may be configured to look for messages seeking that type of service and thus that trigger point may be satisfied. In one example, a trigger point may be configured as a set of Boolean expressions (e.g., x AND y) whose individual components (e.g., x, y) may be resolved to a true or false state by processing attribute/value pairs. In one example, the attribute/value pairs may be described in an extensible markup language (XML) format.

At 450, a determination is made concerning whether a trigger point in the IFC data for the user has been met. If the determination is No, then processing may move ahead to 480. If the determination is Yes, then processing may move ahead to 460. Method 400 may include, at 460, determining an AS address based, at least in part, on the AS COS identifier. In one example, determining the AS address may include selecting an AS record in an AS database using the AS COS identifier as a lookup value. In another example, determining the AS address includes selecting one AS record from a set of AS records, each of which may describe an AS capable of providing the service for the user. In yet another example, determining the AS address may include simply retrieving an AS address (e.g., uniform resource locator (URL)) that was previously resolved based, at least in part, on an AS COS.

Method 400 may also include, at 470, routing the second message using the AS address. Information may also be provided to the AS to which the second message is routed. For example, method 400 may also include, (not illustrated), providing a portion of the IFC data for the user and/or other service data to an AS. Thus, an AS may be able to evaluate the second message with respect to the portion of the IFC data.

In one example, methods are implemented as processor executable instructions and/or operations stored on a computer-readable medium. Thus, in one example, a computer-readable medium may store processor executable instructions operable to perform a method that includes receiving in a CSCF logic a message associated with providing a service for a user. The method may include acquiring an IFC data for the user. The IFC data may include an AS COS data and trigger points that facilitate determining how to route messages to an AS. The method may also include evaluating the message with respect to the IFC data for the user and upon determining that a trigger point in the IFC data for the user has been met, determining an AS address for an AS to which the message will be routed. The AS address may be determined, at least in part, based on the AS COS identifier. The method may then proceed to route the second message using the AS address.

While the above method is described being stored on a computer-readable medium, it is to be appreciated that other example methods described herein can also be stored on a computer-readable medium.

Figure 5:
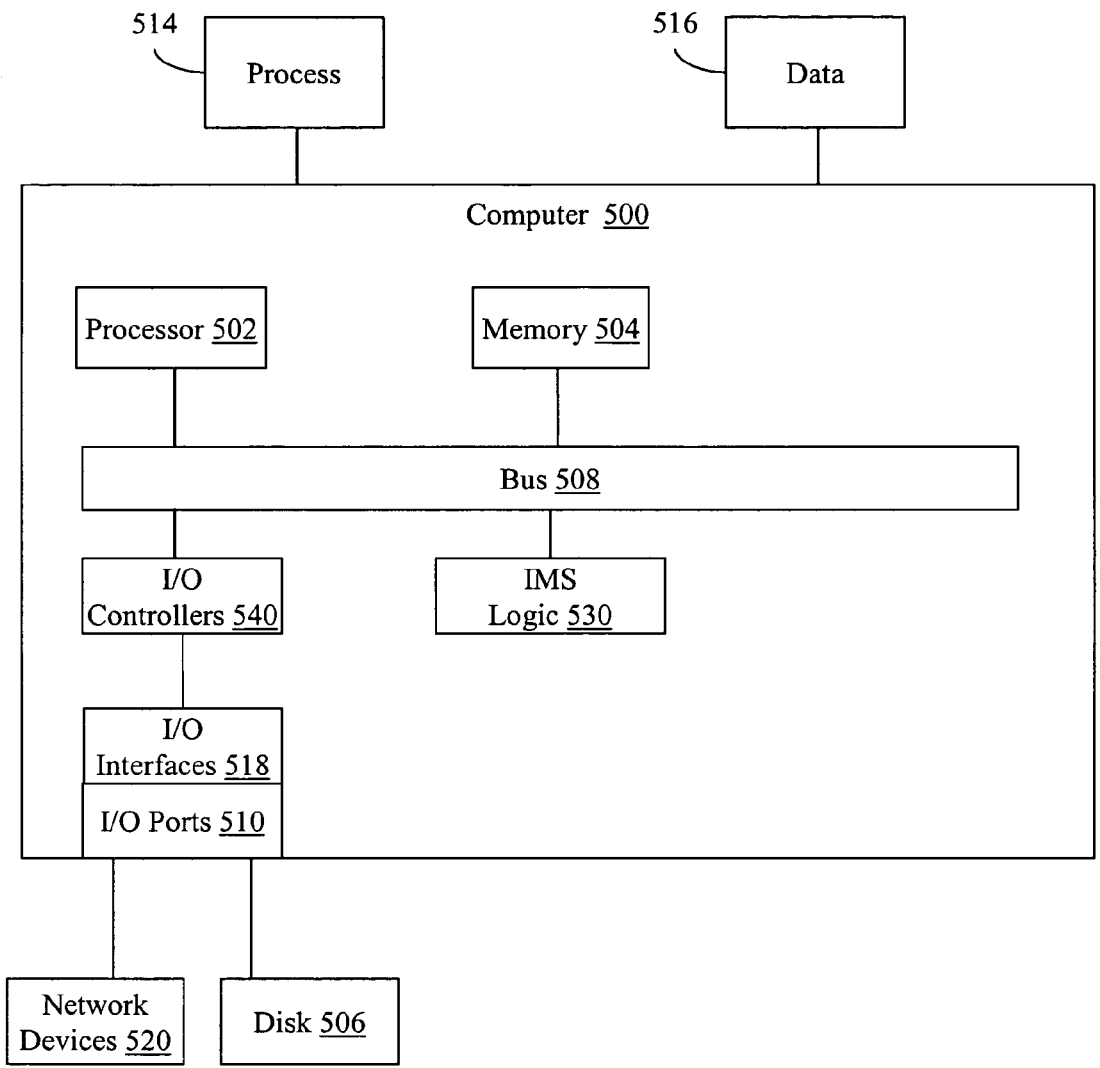
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include an IMS logic 530 configured to facilitate interacting with services. The IMS logic 530 may provide means (e.g., hardware, software, firmware) for provisioning an IMS AS database with AS data, means (e.g., hardware, software, firmware) for provisioning an IMS user database with user data, and means (e.g., hardware, software, firmware) for provisioning an IMS IFC database with data that relates a user to an AS based, at least in part, on an AS COS identifier. While IMS logic 530 is illustrated as a logic operably connected to bus 508, it is to be appreciated that in one example IMS logic 530 may be implemented as software stored on disk 506, brought into memory 504 as a process 514, and executed by processor 502.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices including a magnetic disk drive, a solid state disk drive, a floppy disk drive, a tape drive, a Zip drive, a flash memory card, and/or a memory stick. Furthermore, the disk 506 can include optical drives including a CD-ROM, a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a cross-bar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and the like. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks like integrated services digital networks (ISDN), packet switching networks, and digital subscriber lines (DSL).

Figure 6:
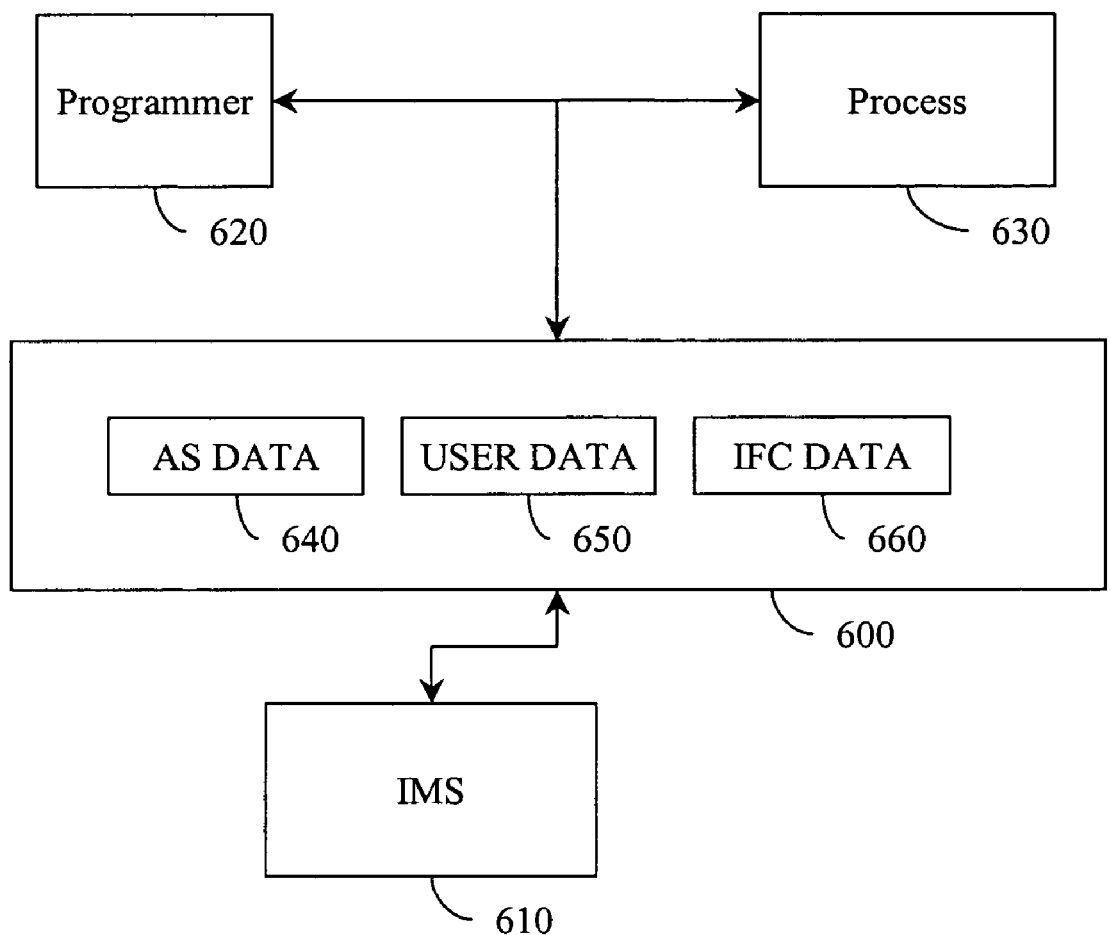
FIG. 6 illustrates an example application programming interface (API).

Referring now to FIG. 6, an application programming interface (API) 600 is illustrated providing access to an IMS 610. The API 600 can be employed, for example, by a programmer 620 and/or a process 630 to gain access to processing performed by IMS 610. For example, a programmer 620 can write a program to access IMS 610 (e.g., invoke its operation, monitor its operation, control its operation) where writing the program is facilitated by the presence of API 600. Rather than programmer 620 having to understand the internals of IMS 610, programmer 620 merely has to learn the interface to IMS 610. This facilitates encapsulating the functionality of IMS 610 while exposing that functionality.

Similarly, API 600 can be employed to provide data values to IMS 610 and/or retrieve data values from IMS 610. For example, a process 630 that provisions an AS database can provide AS data to IMS 610 via the API 600 using, for example, a call provided in the API 600. Thus, in one example of the API 600, a set of application programming interfaces can be stored on a computer-readable medium. The interfaces can be employed by a programmer, computer component, logic, and so on to gain access to IMS 610. The interfaces can include, but are not limited to, a first interface 640 that communicates an AS data, a second interface 650 that communicates a user data, and a third interface 660 that communicates an IFC data that links the AS data and the user data.

Figure 7:
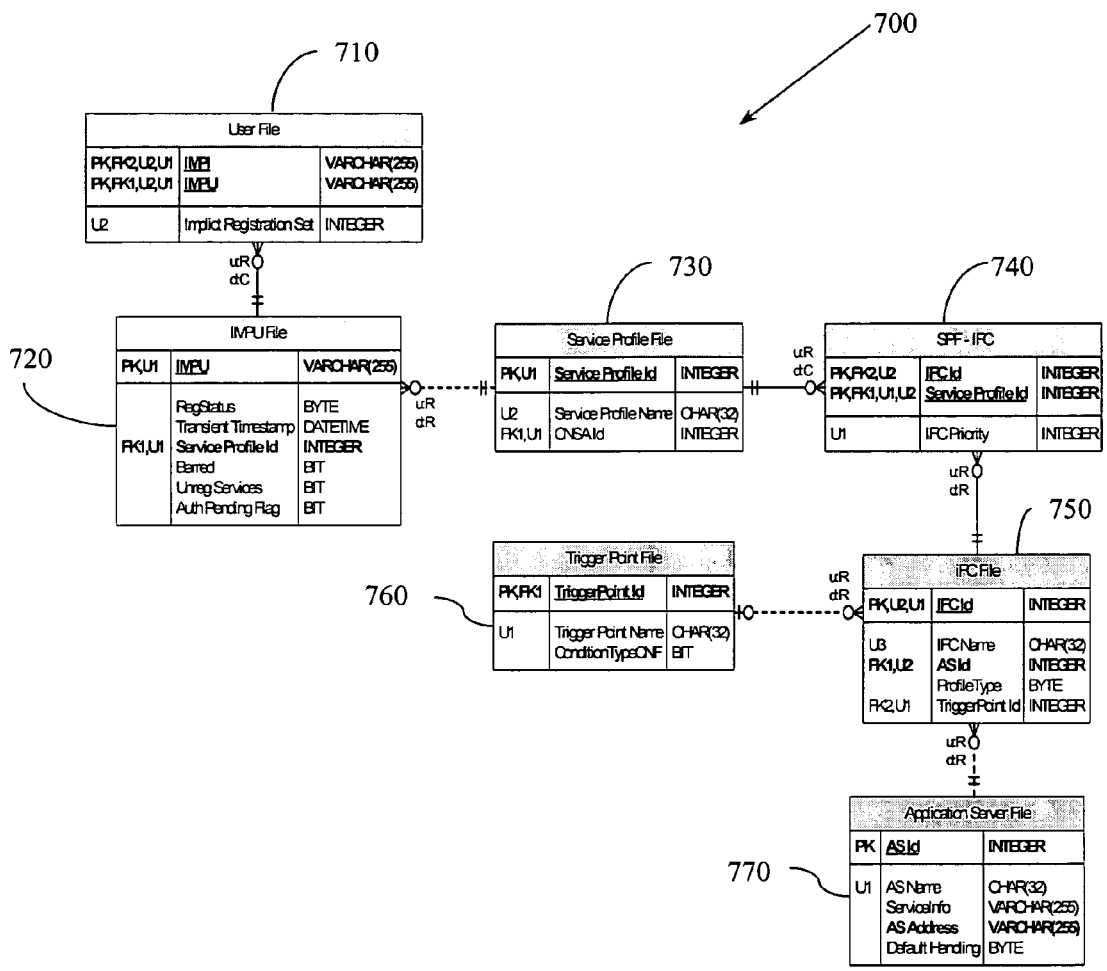
FIG. 7 illustrates an example schema.

FIG. 7 illustrates an example schema 700 that describes various data stores employed in connection with the example systems and methods described herein. It is to be appreciated that schema 700 is but one example and that different tables, different table arrangements, different dependencies, and so on may be employed.

Schema 700 includes a user data store 710 that includes both a private user identifier and a public user identifier. In the example, the public user identifier is used to link the user data store 710 to an IMPU data store 720. The IMPU data store 720 includes more information about a user, including a link to a service profile data store 730. The service profile data store 730 is linked through a service profile/IFC data store 740 to an IFC data store 750. Note that no specific information about an AS has yet been linked to a user. However, abstract information about an AS has been linked using the AS identifier in the IFC data store 750. The IFC data store 750 also includes a trigger point identifier. Thus, when a trigger point described in trigger point data store 760 is satisfied, an AS can be located using the AS identifier link to AS data store 770.

Thus, schema 700 illustrates a configuration where a user has a public and a private identifier. The public identifier can be used to locate more information about the user including a service profile. The service profile can be used to find an IFC(s) associated with a user. The IFC(s) can be used to find trigger points and an AS to access when a trigger point is satisfied. Note that AS specific information is segregated in AS data store 770. Thus, changes to AS data can be confined to AS data store 770, which removes a conventional need to update user data in other data stores (e.g., 710, 720, 730, 740, 750) when AS data changes. This isolation is achieved by including an AS COS number in the ASid field in the IFC data store 750.

Relating schema 700 to the example systems and methods described above, data stores 710, 720, 730, and 740 may provide one example of a user database. Similarly, AS data store 770 may provide one example of an AS database and IFC data store 750 may provide one example of an IFC database. Thus, in some examples, "database" is used to refer to a table. In other examples, "database" may be used to refer to a set of tables. In still other examples, "database" may refer to a set of data stores and methods for accessing and/or manipulating those data stores.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B. only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    an application server (AS) database configured to store AS information concerning an AS configured to provide multimedia services, the AS information being stored in an AS records in the AS database, an AS record including an AS class of service (COS) identifier, the AS database employing the AS COS identifier as a primary key; and a user database configured to store user information concerning a user subscribed to access a service provided by an AS, the user information being stored in a user record in the user database, a user record including one or more initial filter criteria (IFC) entries, an IFC entry being configured with an AS COS identifier;

the AS database and the user database being operably connectable, via a home subscriber server (HSS) logic, to a call session control function (CSCF) logic configured:

to receive a message associated with a user;

to retrieve a user record concerning the user from the user database;

to evaluate the message in light of an IFC entry associated with the retrieved user record; and to selectively direct the message to an AS based, at least in part, on determining an AS address using the AS database as indexed by the AS COS identifier available in the IFC entry.

2. The system of claim 1, an AS being configured to provide one or more of, a telephony service, a text messaging service, a video-conferencing service, a multi-player game service, and a content sharing service.

3. The system of claim 1, the AS database including one or more AS records, an AS record comprising:
an AS COS identifier; and
an AS address.

4. The system of claim 1, the user database including one or more user records that include one or more IFC entries per user record, an IFC entry comprising:
an IFC identifier; and
an AS COS identifier.

5. The system of claim 1, including an AS update logic configured to update an AS record in the AS database upon determining that information concerning an AS has changed.

6. The system of claim 1, the message being a Session Initiation Protocol (SIP) message.

7. The system of claim 1, the message being a Diameter message.

8. The system of claim 1, the AS database and the user database being organized in an HSS database, the CSCF logic being configured to communicate with the HSS database using the Cx interface.

9. A computer-implemented method, comprising:
receiving, in a call session control function (CSCF) logic implemented in a computer, a first message associated with providing a service for a user;
acquiring an initial filter criteria (IFC) data for the user from a Home Subscriber Server (HSS) logic implemented in the computer, the IFC data including an application server (AS) class of service (COS) data and one or more trigger points;
receiving in the CSCF logic a second message associated with providing the service for the user;
evaluating, by the computer, the second message with respect to the IFC data for the user; and
upon determining that a trigger point in the IFC data for the user has been met:
determining an AS address based, at least in part, on the AS COS identifier; and
routing the second message using the AS address.

10. The method of claim 9, where acquiring the IFC data includes performing a Cx SAR/SAA exchange between the CSCF logic and the HSS logic.

11. The method of claim 9, where determining the AS address includes selecting an AS record in an AS database using the AS COS identifier as a lookup value.

12. The method of claim 9, where determining the AS address includes selecting one AS record from a set of AS records in the AS database, where each member of the set of AS records describes an AS capable of providing the service for the user.

13. The method of claim 9, including:
providing a portion of the IFC data for the user to an AS; and
upon receiving the second message at the AS, evaluating the second message with respect to the portion of the IFC data.

14. The method of claim 9, the first message being one of a Session Initiation Protocol (SIP) message, and a Diameter message, the second message being one of an SIP message, and a Diameter message.

15. A computer-readable medium storing processor executable instructions operable to perform a method, the method comprising:
receiving in a call session control function (CSCF) logic a first message associated with providing a service for a user;
acquiring an initial filter criteria (IFC) data for the user from a Home Subscriber Server (HSS) logic, the IFC data including an application server (AS) class of service (COS) data and one or more trigger points;
receiving in the CSCF logic a second message associated with providing the service for the user;
evaluating the second message with respect to the IFC data for the user; and
upon determining that a trigger point in the IFC data for the user has been met:
determining an AS address based, at least in part, on the AS COS identifier; and
routing the second message using the AS address.

* * * * *